United States Patent Office 3,728,321
Patented Apr. 17, 1973

3,728,321
POLYMERIC EPOXIDES
Edwin J. Vandenberg, Wilmington, Del., assignor to Hercules Incorporated, Wilmington, Del.
No Drawing. Continuation-in-part of application Ser. No. 812,079, May 11, 1959, now Patent No. 3,135,705, dated June 2, 1964, which is a continuation-in-part of abandoned application Ser. No. 738,626, May 29, 1958. This application June 30, 1960, Ser. No. 39,811
Int. Cl. C08f 7/12
U.S. Cl. 260—88.3 A
10 Claims

ABSTRACT OF THE DISCLOSURE

High molecular weight, water-insoluble copolymers of propylene oxide and higher alkylene oxides with an ethylenically unsaturated glycidyl ether and particularly with allyl glycidyl ether are described.

---

This application is a continuation-in-part of my application Ser. No. 738,626, filed May 29, 1958 and now abandoned, and of my application Ser. No. 812,079, filed May 11, 1959 and issued as U.S. Pat. 3,135,705 on June 2, 1964, which is a continuation-in-art of my abandoned application Ser. No. 738,626, filed May 29, 1958.

This invention relates to new polymeric epoxides, and more particularly, to high molecular weight copolymers of propylene oxide and higher alkylene oxides with ethylenically unsaturated epoxides.

In accordance with this invention high molecular weight copolymers of alkylene oxides containing three or more carbon atoms with ethylenically unsaturated glycidyl ethers have been discovered. These copolymers are unique in that they are essentially linear polyethers, copolymerization having taken place through the epoxy groups. These new polyethers are water-insoluble elastomeric polymers which, since they retain the ethylene double bonds in the ethylenically unsaturated portion of the polymer, may be vulcanized with standard sulfur recipes to produce excellent rubbers.

The new copolymers of this invention are those produced by the copolymerization of an alkylene oxide containing at least three carbon atoms with at least one other epoxide, at least one of which is an ether that contains, in addition to the oxirane ring, an ethylenically unsaturated group. Exemplary of these ethylenically unsaturated ethers that contain an oxirane ring that may be copolymerized with the alkylene oxides to produce the new copolymers of this invention are ethylenically unsaturated glycidyl ethers, etc., which have the general formula

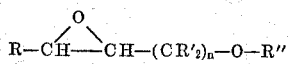

where $n$ is an integer of from 1 to 4, R is —H, -alkyl or —(CR$'_2$)$_n$—O—R″, R′ is —H, or -alkyl, and R″ is an ethylenically unsaturated radical, as for example, ethylenically unsaturated aliphatic radicals such as vinyl, propenyl, isopropenyl, allyl, methallyl, butenyl, oleyl, etc., and cycloalkyl or aryl radicals containing an ethylenically unsaturated substituent and cycloalkyl radicals containing an ethylenic double bond in the ring, as for example, 4-vinylcyclohexyl, α-terpinyl, γ-terpinyl, abietyl, cyclohexenylmethyl, o-allylphenyl, p-vinylbenzyl, etc. Preferably the ethylene double bond will be at least β to the ether oxygen. Exemplary of these ethers are allyl glycidyl ether, methallyl glycidyl ether, vinylcyclohexyl glycidyl ether, o-allylphenyl glycidyl ether, the allyl ether of 2,3-epoxy-butan-1-ol, the allyl ether of 2,3-epoxy-hexan-1-ol, the diallyl ether of 2,3-epoxy-butan-1,4-diol, etc. Other ethers that can be used are vinyl glycidyl ether, tripropenyl glycidyl ether of pentaerythritol, etc.

Any alkylene oxide containing at least three carbon atoms or mixtures thereof may be copolymerized with the ethylenically unsaturated epoxides to produce the new polymers of this invention. Exemplary of such alkylene oxides are propylene oxide, butene-1 oxide, cis- and trans-butene-2 oxides, hexene-1 oxide, hexene-2 oxides, dodecene-1 oxide, hexadecene-1 oxide, octadecene-1 oxide, etc. Mixtures of any of these alkylene oxides may be used so that the final polymer is a terpolymer, quaternary polymer, etc., or any other epoxide may be included to produce a terpolymer, quaternary polymer, etc. However, if ethylene oxide is included as the third monomer, the amount of ethylene oxide introduced into the polymer must be kept below about 10%, and preferably below about 5%, since above this amount the polymer becomes water sensitive and/or water soluble and, hence, is not useful for most rubber applications. The exact amount of ethylene oxide that may be incorporated will depend on the composition of the remainder of the polymer. Thus, for example, larger amounts of ethylene oxide may be incorporated in a copolymer of butene oxide and allyl glycidyl ether than in a copolymer of propylene oxide and allyl glycidyl ether.

The copolymers of this invention will then contain at least the following two repeating units:

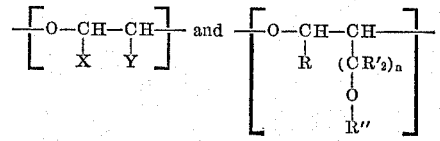

where X is H or alkyl, Y is alkyl, and $n$, R, R′ and R″ are defined as set forth above.

These copolymers contain from about 99.5% to about 50% of the alkylene oxide containing at least three carbon atoms and from about 0.5% to about 50% of the ethylenically unsaturated epoxide monomer, and preferably will contain from about 98% to about 75% of the said alkylene oxide and from about 2% to about 25% of the ethylenically unsaturated epoxide. The amount of the ethylenically unsaturated epoxide required will vary with the unsaturated epoxide, but will generally be that amount required to give good rubber, physical properties. As pointed out above, in the case of ethylene oxide incorporated as an additional epoxide no more than about 10% of ethylene oxide should be incorporated since above this amount the copolymer will be either partially water soluble or excessively swollen by water.

The new copolymers of this invention are characterized as being elastomeric products which are capable of vulcanization to yield highly desirable rubbers. In the unvulcanized state they are elastomeric polymers which are generally snappy, tough rubbers. They are further characterized by being insoluble in water, but soluble in most organic solvents, and particularly in hydrocarbon solvents. These copolymers are high molecular weight, substantially linear polyethers which preferably have a reduced specific viscosity of at least about 2.0, and more preferably at least about 3.0 when measured as a 0.1% solution in benzene at 25° C. The copolymers of this invention, being organo soluble and hence not cross-linked, are easily processed and may then be compounded and vulcanized to produce excellent rubbers which are outstanding, particularly in low temperature properties and heat build-up. Although largely amorphous copolymers are preferred for heat rubbery characteristics, some degree of crystallinity in the copolymer is somewhat advantageous in some cases. The amount of crystallinity should not exceed that amount which interferes seriously with the rubbery properties. In general, it should be below about 25% and preferably below about 15%. Higher crystallinity may appear on stretching and is desirable in many cases.

The new polyethers of this invention may be prepared by contacting a mixture of the alkylene oxide and the epoxide containing ethylenic unsaturation with an organo-aluminum compound, preferably one which has been reacted with from 0.1 to 2 moles of a chelating agent such as acetylacetone, trifluoroacetylacetone, etc., and/or reacted with from about 0.1 to about 1.5 moles of water and preferably 0.5 to 1 mole of water per mole of the organoaluminum compound. Exemplary of the organo-aluminum compounds that may be so reacted with a chelating agent and/or water and used as the catalyst are triethylaluminum, tripropylaluminum, triisobutylaluminum, trioctylaluminum, diethylaluminum hydride, diisobutylaluminum hydride, etc.

The polymerization reaction is generally carried out in the presence of an inert, liquid, organic diluent but may be carried out in essentially bulk polymerization process. Suitable diluents that may be used for the polymerization are the ethers such as diethyl ether, dipropyl ether, dibutyl ether, etc., halogenated hydrocarbons such as chlorobenzene, methylene chloride, etc., or preferably a hydrocarbon diluent such as propane, butane, pentanes, n-heptane, cyclohexane, benzene, toluene, etc., and mixtures of such diluents. The temperature of the polymerization process may be varied over a wide range generally from about —80° C. to about 250° C. and preferably from about —30° C. to about 150° C. and while atmospheric or autogenous pressure is usually used, the pressure may be varied from subatmospheric up to several atmospheres, if desired.

The following examples illustrate the preparation of new high molecular weight alkylene oxide copolymers in accordance with this invention. All parts and percentages are by weight unless otherwise indicated. The molecular weight of the polymers is shown by their reduced specific viscosity (RSV). By the term "reduced specific viscosity" is meant the $\eta_{sp.}/c$ determined on a 0.1% solution of the polymer in benzene containing 0.1 g. of the polymer per 100 ml. of solution, at 25° C. unless otherwise indicated. For the most accurate RSV determination, the catalyst should be removed and the polymer dried in the absence of air, for example, in an inert atmosphere such as nitrogen.

EXAMPLES 1–7

In each of these examples a polymerization vessel in which the air had been replaced with nitrogen was charged with the diluent which was either n-heptane or a mixture of ether and heptane, except in Examples 6 and 7 where the only diluent present was that of the catalyst solution, the alkylene oxide, and the ethylenically unsaturated epoxide. After equilibrating at the reacting temperature, a solution of the catalyst was injected. The catalyst solution in each case was prepared by diluting a 25% solution of triethylaluminum in n-heptane to 0.5 molar with ether, reacting this solution with acetylacetone in the cited molar ratio (one mole in Example 1 and 0.5 mole in Examples 2–7 per mole of aluminum), agitating the solution at 30° C. for 16 hours, and then adding 0.5 mole of water per mole of aluminum, and again agitating the solution at 30° C. for 16 hours. In Table I are set forth the monomers that were copolymerized, the amount of each, the diluent used, and the total amount thereof, the catalyst and amount thereof expressed as parts of triethylaluminum, the reaction time and temperature, the percent conversion to isolated polymer obtained, the RSV of each polymer as determined on a 0.1% solution in benzene at 25° C in Examples 1–3, 6 and 7 and decahydronaphthalene at 135° C. in Examples 4 and 5. The monomers copolymerized are indicated in the table by the following abbreviations:

PO=Propylene oxide
BO=1-butene oxide
DO=1-dodecene oxide
$C_{16}$–$C_{18}O$=The epoxide of a mixture of $C_{16}$ to $C_{18}$ 1-olefins
AGE=Allyl glycidyl ether The copolymers in Examples 1 and 2 were isolated by adding sufficient ether to make the solution of low viscosity for ease in handling, then washing the reaction mixture first with a 3% aqueous solution by hydrogen chloride, then with water until neutral, then with a 2% aqueous solution of sodium bicarbonate, and again with water. After adding an amount of Santonox, i.e. 4,4′-thiobis(6-tert-butyl-m-cresol), in methanol equal to 0.5% based on the polymer, to the reaction mixture, the ether was evaporated and the polymer was dried. The copolymers in Examples 3, 4, and 5 were isolated by adding sufficient ether to make the solution of low viscosity for ease in handling, then washing the reaction mixture twice with a 3% aqueous solution of hydrogen chloride, agitating for one hour during each wash, and then with water until neutral. After adding an amount of Santonox equal to 0.5% based on the weight of the polymer, the ether was evaporated and the polymer was dried for 16 hours at 80° C. under vacuum. In Examples 6 and 7 the polymerization was stopped by adding 4 parts of a 1 molar solution of ammonia in 95:5 ethanol-water, then heating the reaction mixture for 20 hours at 50° C. The copolymers were isolated by adding 1% of phenyl-β-naphthylamine based on the polymer as an antioxidant and sufficient benzene to make the solution easily handled. The reaction mixture was then agitated for 16 hours at 30° C., and the solvents evaporated. The copolymers were then dried for 16 hours at 80° C. The copolymers produced in these examples were all largely amorphous, a number of them being completely amorphous as shown by X-ray diffraction.

TABLE I

| Example Number | Diluent Total parts | Components | Monomer | Parts | Catalyst [1] | Parts | Reaction conditions | Isolated polymer Percent conv. | RSV |
|---|---|---|---|---|---|---|---|---|---|
| 1 | 17.6 | 20% ether; 80% n-heptane | PO / AGE | 9.4 / 0.6 | $(C_2H_5)_2AlA \cdot 0.5\ H_2O$ | 0.74 | 4 hours at 30° C | 14 | 15.3 |
| 2 | 66 | n-Heptane | PO / AGE | 9 / 1 | $(C_2H_5)_3Al \cdot 0.5\ A \cdot 0.5\ H_2O$ | 0.23 | 7 hours at 50° C | 21 | 15.8 |
| 3 | 66 | 2% ether; 98% n-heptane | BO / AGE | 8.9 / 1.1 | $(C_2H_5)_3A \cdot \cdot 0.5\ A \cdot 0.5\ H_2O$ | 0.23 | 3 hours at 50° C | 46 | 5.7 |
| 4 | 80 | 4% ether; 96% n-heptane | DO / AGE | 9 / 1 | $(C_2H_5)_3Al \cdot 0.5\ A \cdot 0.5\ H_2O$ | [2] 0.45 | 24 hours at 50° C | 69 | 4.0 |
| 5 | 84 | 6% ether; 94% n-heptane | $C_{16}$-$C_{18}$O / AGE | 9 / 1 | $(C_2H_5)_3Al \cdot 0.5\ A \cdot 0.5\ H_2O$ | [3] 0.68 | 31 hours at 50° C | 72 | 4.2 |
| 6 | 6 | 67% ether; 33% n-heptane | PO / BO / AGE | 6 / 3 / 1 | $(C_2H_5)_3Al \cdot 0.5\ A \cdot 0.5\ H_2O$ | 0.45 | 19 hours at 30° C | 98 | 2.9 |
| 7 | 6 | 67% ether; 33% n-heptane | PO / BO / AGE | 4.5 / 4.5 / 1 | $(C_2H_5)_3Al \cdot 0.5\ A \cdot 0.5\ H_2O$ | 0.45 | 19 hours at 30° C | 99 | >2.5 |

[1] A = Acetylacetone.
[2] Added in two equal portions at 0 and 2 hours.
[3] Added in three equal portions at 0, 2 and 24 hours.

A description of the copolymers produced in Examples 1–7 is summarized in Table II along with the physical data on vulcanizates prepared from a number of them.

In these examples and the following examples the copolymers were vulcanized by compounding 100 parts of each copolymer on a two-roll mill with the specified vulcanization formula, and then press-curing at 310° F. for the specified time. The vulcanization formulas used, based on 100 parts of polymer, were

| | Formula Number | | | |
|---|---|---|---|---|
| | I | II | III | IV |
| Fast extruding furnace black | 30 | | | |
| High abrasion furnace black | | 50 | 50 | 50 |
| Sulfur | 2 | 2 | 1 | 2 |
| Zinc oxide | 3 | 3 | 5 | 5 |
| Stearic acid | 2 | 2 | 1 | 1 |
| Tetramethylthiuram disulfide | | | 2 | 2 |
| Mercaptobenzothiazole | 1.5 | 1.5 | | |
| Benzothiazyldisulfide | | | 1 | 1 |

The vulcanization mixtures of Examples 1–5 were press-cured at 310° F. for 40 minutes, and those of Examples 6 and 7 were press-cured at 310° F. for 60 minutes.

Typical of the advantages to be found in these copolymers is exemplified by the vulcanizate obtained from the propylene oxide-allyl glycidyl ether of Example 2 which, in addition to the excellent properties shown in Table II, is also found to be superior to natural and GR-S rubbers in its hysteresis (lower heat build-up on flexing) and in its low temperature properties, e.g. it had a torsional rigidity modulus of 10,000 p.s.i. at —65° C.

amples 1–7 above using as the catalyst triethylaluminum which had been prereacted with acetylacetone and water. In each example 10 parts of the monomer mixture was polymerized in 70 parts of diluent made up of 4% ether in Examples 8 and 9 and 1% ether in Examples 10 and 11, the remainder being n-heptane. The polymerizations were all carried out at 50° C. In Table III are set forth the catalyst used in each case and the parts thereof expressed as parts of triethylaluminum and the reaction time. The polymerization reaction in Examples 8, 10 and 11 was stopped by adding 4 parts of a 1 molar solution of ammonia in 95:5 ethano-water and then heating for eight hours at 50° C. The polymerization reaction in Example 9 was stopped by adding 4 parts of ethanol. The copolymer of Example 9 was isolated by adding sufficient ether to make the solution of low viscosity for ease in handling, then washing twice with 3% hydrogen chloride and then with water until neutral, stirring for one hour during each acid wash. After adding an amount of Santonox equal to 0.5% based on the polymer to the reaction mixture, the solvents were evaporated and the polymer was dried for 16 hours at 80° C. under vacuum. The copolymers of Examples 8, 10 and 11 were isolated by simply removing the solvents from the reaction mixture and drying without any purification procedure. The percent conversion, RSV (0.1% solution in benzene at 25° C. in Examples 9–11 and in 90:10 benzene:n-butylamine at 25° C. in Example 8), and the percent of allyl glycidyl ether in the copolymer as determined by Kemp bromine number are given in Table III.

TABLE II

| Ex. No. | Copolymer composition | Percent by weight | Description | Water solubility | Vulcanization formula | Tensile strength, p.s.i. | Modulus, 300% p.s.i. | Ultimate elongation, percent | Shore hardness A2 | Percent gel formation | Percent swell (toluene) |
|---|---|---|---|---|---|---|---|---|---|---|---|
| 1 | PO:AGE | 93.5:6.5 | Tough, snappy rubber | Insoluble | II | | | | | 96 | 530 |
| 2 | PO:AGE | 92:8 | do | do | I | 2,190 | 820 | 625 | 55 | 97 | 405 |
| 3 | BO:AGE | 84:16 | do | do | I | 1,400 | 940 | 400 | 50 | 96 | 380 |
| 4 | DO:AGE | 81:19 | do | do | I | 945 | | 280 | 72 | | |
| 5 | $C_{16}$-$C_{18}$O:AGE | 80:20 | do | do | I | 585 | | 175 | 73 | | |
| 6 | PO:BO:AGE | 60:30:10 | do | do | II | 1,840 | 720 | 700 | 56 | | |
| 7 | PO:BO:AGE | 45:45:10 | do | do | II | 2,110 | 1,460 | 400 | 61 | | |

EXAMPLES 8–11

In these examples propylene oxide and allyl glycidyl ether were copolymerized in a weight ratio of 90:10 to obtain copolymers of various viscosities, and the copolymers were then vulcanized to demonstrate the excellent properties of such copolymers. The polymerizations were carried out by the general procedure described for Examples Each of the copolymers produced in these examples was vulcanized as described for Examples 1–7, press-curing in Examples 8 and 9a for 40 minutes at 310° F., in Example 9b for 60 minutes at 310° F., and in Examples 10 and 11 for 45 minutes at 310° F. The physical data on the vulcanizates for each of these copolymers are set forth in Table III.

TABLE III

| Example Number | Catalyst | 50° C. reaction time, hrs. | Isolated polymer Parts | Isolated polymer Percent conv. | Isolated polymer RSV | Isolated polymer Percent AGE | Vulcanization formula | Tensile strength, p.s.i. | Modulus, 300 percent p.s.i. | Ultimate elongation, percent | Break set, percent | Shore hardness A2 | Heat build-up, °F. | Tear strength, p.s.i. |
|---|---|---|---|---|---|---|---|---|---|---|---|---|---|---|
| 8 | (C₂H₅)₃Al·0.5 A·0.5 H₂O | 24 | 0.45 | 67 | 8.7 | 10.7 | I | 2,060 | 1,510 | 450 | 10 | 68 | 7 | 225 |
| 9a | (C₂H₅)₃Al·0.5 A·0.5 H₂O | 5 | 0.45 | 38 | 8.6 | 10.3 | II | 1,890 | 845 | 560 | 20 | 55 | 8 | 215 |
| 9b | | | | | | | | 1,910 | 1,360 | 650 | 40 | 65 | | |
| 10 | (C₂H₅)₃Al·0.5 A·0.5 H₂O | 4 | 0.23 | 38 | 9.8 | | III | 2,240 | 605 | 920 | 40 | 55 | 20 | |
| 11 | (C₂H₅)₃Al·0.2 A·0.5 H₂O | 6 | 0.23 | 53 | 12.8 | 11.4 | II | 2,520 | 1,330 | 550 | 30 | 65 | 20 | |

TABLE IV

| Example | Diluent, percent Parts | Diluent, percent Ether | Isolated polymer, percent Conv. | Isolated polymer, percent RSV | Copolymer composition PO:AGE | Vulcanization formula | Physical properties of vulcanizate Tensile strength, p.s.i. | Modulus 300%, p.s.i. | Ultimate elongation 100% | Shore hardness A2 | Resilience, percent | Break set, percent | Heat build-up |
|---|---|---|---|---|---|---|---|---|---|---|---|---|---|
| 12 | 32 | 0 | 100 | 10.9 | 98.5:1.5 | IV | 2,200 | 715 | 850 | 64 | | 45 | 61 |
| 13 | 5.6 | 70 | 100 | >8.8 | 97:3 | III | 1,910 | 460 | 980 | 50 | 36 | 40 | |
| 14 | 5.6 | 70 | 100 | >8.8 | 95:5 | III | 1,800 | 880 | 760 | 56 | 36 | 45 | |
| 15 | 5.6 | 70 | 100 | >2.2 | 93:7 | III | 1,800 | 300 | 300 | 65 | 36 | 20 | |
| 16 | 70 | 0 | 97 | 6.8 | 97:3 | III | 2,260 | 1,090 | 610 | 61 | | | 42 |
| 17 | 70 | 0 | 100 | 8.8 | 95:5 | III | 2,310 | 1,710 | 400 | 70 | 38 | | 22 |
| 18 | 70 | 0 | 96 | 6.6 | 90:10 | II | 2,040 | 1,280 | 450 | 61 | | 40 | |

EXAMPLES 12-18

These examples demonstrate the effect of varying the amount of the ethylenically unsaturated epoxide incorporated in the copolymer. In Examples 12–16 and 18 the polymerization vessel was charged with the diluent (where used), the monomer charge which amounted to a total of 10 parts and 1% based on the monomer charge of phenyl-β-napthylamine. In Example 17 the diluent, 0.1 part of phenyl-β-naphthylamine, and the catalyst solution were charged and the monomer charge (10 parts) was added over a period of 3 hours. The catalyst used in Example 12 was triethylaluminum which had been prereacted with 0.2 of acetylacetone and 0.5 mole of water in n-heptane in the presence of 3 moles of ether. The catalyst used in Examples 13–15 was triethylaluminum which had been prereacted with 0.5 mole of acetylacetone and 0.5 mole of water as described in Examples 1–7. The catalyst used in Examples 16–18 was triethylaluminum which had been prereacted at 1 molar concentration in n-heptane with 0.13 mole of acetylacetone and 0.5 mole of water in the presence of 3 moles of ether. The amount of catalyst charged was equal to 0.45 part of triethylaluminum in Examples 13–15 and 0.34 part of triethylaluminum in Examples 12 and 16–18. In Example 16 it was added in two portions, ⅔ initially and ⅓ after one hour. The polymerization in Examples 12–15 were run for 19 hours at 30° C., in Example 16, for 16 hours at 50° C., and in Examples 17 and 18 for 10 hours at 50° C. The polymerization of Example 12 was stopped by adding 1.6 parts of anhydrous ethanol and in Examples 13 to 18 by adding 4 parts of 1 molar ammonia in 95% ethanol. The polymers were isolated by drying the reaction mixture under vacuum for 24 hours at 80° C.

In Table IV is set forth the amount of diluent present and the percent thereof that was ether, the remainder being n-heptane except in Examples 16 and 17 where there was used a commercial heptane boiling at 201–210° F. and containing 52% naphthenes, 45% paraffins, 2% aromatics and 0.6% olefins. Also set forth is the percent conversion to isolated polymer, the RSV of the isolated polymer (0.1% in benzene at 25° C.), and the composition of the copolymer indicated as percent of propylene oxide and allyl glycidyl ether together with the physical properties of the vulcanizates obtained from these polymers. The copolymers of Examples 13–15 and 18 were press-cured for 60 minutes at 310° F. and the copolymers of Examples 12, 16 and 17 were press-cured for 40 minutes at 310° F.

EXAMPLE 19

A polymerization vessel with a nitrogen atmosphere was charged with 9 parts of propylene oxide, 1 part of allyl glycidyl ether, 0.1 part of phenyl-β-naphthylamine, and 5 parts of high abrasion furnace black. After the vessel and contents were equilibrated at 30° C., the catalyst solution was added. The catalyst was 0.90 part of triethylaluminum which had been prereacted with 0.5 mole of acetylacetone and 0.5 mole of water as described in Examples 1–7. After 19 hours at 30° C., the polymerization was stopped by adding 4 parts of ethanol and the product was dried for 16 hours at 80° C. under vacuum. It was a tough, rubbery, black solid and amounted to a conversion of 93% of the monomer charge to polymer. It was vulcanized using the vulcanization Formula II and press-curing for 60 minutes at 310° F. to give a typical, black loaded, cross-linked, rubbery composition.

EXAMPLE 20

A polymerization vessel with a nitrogen atmosphere was charged with 65 parts of n-heptane, 9.7 parts of cis-butene-2 oxide and 0.3 part of allylglycidyl ether. The vessel and contents were cooled to −78° C. and 0.8 part of triisobutylaluminum in 3.3 parts of n-heptane was added. After 4 hours at −78° C., the polymerization reaction was stopped by adding 4 parts of anhydrous ethanol. The reaction mixture was then diluted with ether, washed first with a 3% aqueous solution of hydrogen chloride, then with water until neutral, then with a 2% aqueous solution of sodium bicarbonate and again with water. The copolymer was then isolated by precipitation with 5 volumes of methanol containing 0.05% Santonox, after which it was collected and washed twice with said methanol containing Santonox. The cis-butene-2 oxide—allyl glycidyl ether copolymer so obtained was a snappy, tacky rubber which had an RSV of 2.3 (0.1% solution in chloroform at 25° C.). It was obtained in a conversion of 65%. A Kemp bromine number indicated the presence of 2.5% allyl glycidyl ether in the copolymer.

This copolymer was vulcanized using vulcanization Formula IV and press-curing for 40 minutes at 310° F. The physical properties of this vulcanizate were:

| | |
|---|---|
| Tensile strength p.s.i. | 2110 |
| Modulus, 300% p.s.i. | 980 |
| Ultimate elongation percent | 600 |
| Shore Hardness A2 | 65 |
| Heat build-up ° F. | 17 |

What I claim and desire to protect by Letters Patent is:

1. As a new composition of matter, a water-insoluble copolymer consisting of from about 50% to about 99.5% by weight of one or more alkylene oxides containing from 3 to 18 carbon atoms and having the epoxy group in an oxirane ring, and from about 0.5% to about 50% by weight of one or more unsaturated epoxides having the formula

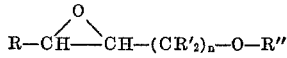

where $n$ is 1 to 4, R is a radical selected from the group consisting of hydrogen, alkyl, and $-(CR'_2)_n-O-R''$, R' is a radical selected from the group consisting of hydrogen and alkyl and R'' is an ethylenically unsaturated radical, said unsaturated epoxides containing from 5 to 44 carbon atoms and said copolymer having a reduced specific viscosity of at least about 2.0 as measured on a 0.1% solution in benzene at 25° C. and resulting from reaction through the epoxy group of said alkylene oxides and said unsaturated epoxides.

2. The composition of claim 1 wherein said unsaturated epoxides have the formula

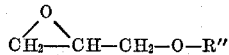

where R'' is an ethylenically unsaturated hydrocarbon radical containing from 2 to 20 carbon atoms.

3. The composition of claim 2 wherein one of said unsaturated epoxides is allyl glycidyl ether.

4. The composition of claim 3 wherein one of said alkylene oxides is propylene oxide.

5. The composition of claim 3 wherein one of said alkylene oxides is a butene oxide.

6. A water-insoluble copolymer consisting of propylene oxide and allyl glycidyl ether, said copolymer containing from about 50% to about 99.5% by weight of said propylene oxide, having a reduced specific viscosity of at least about 2.0 as measured on a 0.1% solution in benzene at 25° C. and resulting from reaction through the epoxy group of said propylene oxide and said allyl glycidyl ether, the epoxy group of said propylene oxide being a oxirane ring.

7. A water-insoluble copolymer consisting of butene-1 oxide and allyl glycidyl ether, said copolymer containing from about 50% to about 99.5% by weight of said butene-1 oxide, having a reduced specific viscosity of at least about 2.0 as measured on a 0.1% solution in benzene at 25° C. and resulting from reaction through the epoxy group of said butene-1 oxide and said allyl glycidyl ether.

8. A water-insoluble copolymer consisting of propylene oxide, butene-1 oxide and allyl glycidyl ether, the epoxy group of said propylene oxide being an oxirane ring, said copolymer having a reduced specific viscosity of at least about 2.0 as measured on a 0.1% solution in benzene at 25° C. and resulting from reaction through the epoxy group of said propylene oxide, said butene-1 oxide and said allyl glycidyl ether and wherein the said propylene oxide and butene-1 oxide together comprise from about 50% to about 99.5% by weight of the copolymer.

9. A water-insoluble copolymer consisting of cis-butene-2 oxide and allyl glycidyl ether, said copolymer containing from about 50% to about 99.5% by weight of said cis-butene-2 oxide, having a reduced specific viscosity of at least about 2.0 as measured on a 0.1% solution in benzene at 25° C. and resulting from reaction through the epoxy group of said cis-butene-2- oxide and said allyl glycidyl ether.

10. A solid copolymer which results from the reaction of an admixture containing a lower 1,2-alkylene oxide and allyl glycidyl ether, said reaction being effected through the epoxy group of said lower 1,2-alkylene oxide and said allyl glycidyl ether, wherein said lower 1,2-alkylene oxide is propylene oxide.

No references cited.

HARRY WONG, JR., Primary Examiner

U.S. Cl. X.R.

260—29.6 R, 41 C, 45.9 R, 79.5 C, 80.3 R